Dec. 14, 1954     L. C. GETSINGER     2,696,706
CRANBERRY HARVESTING MACHINE
Filed Jan. 13, 1953     2 Sheets-Sheet 1
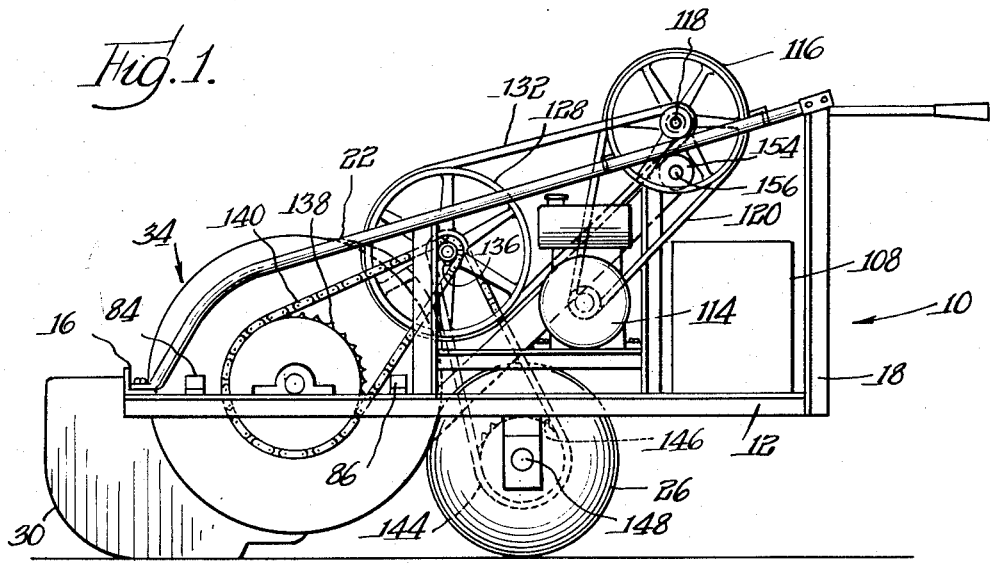
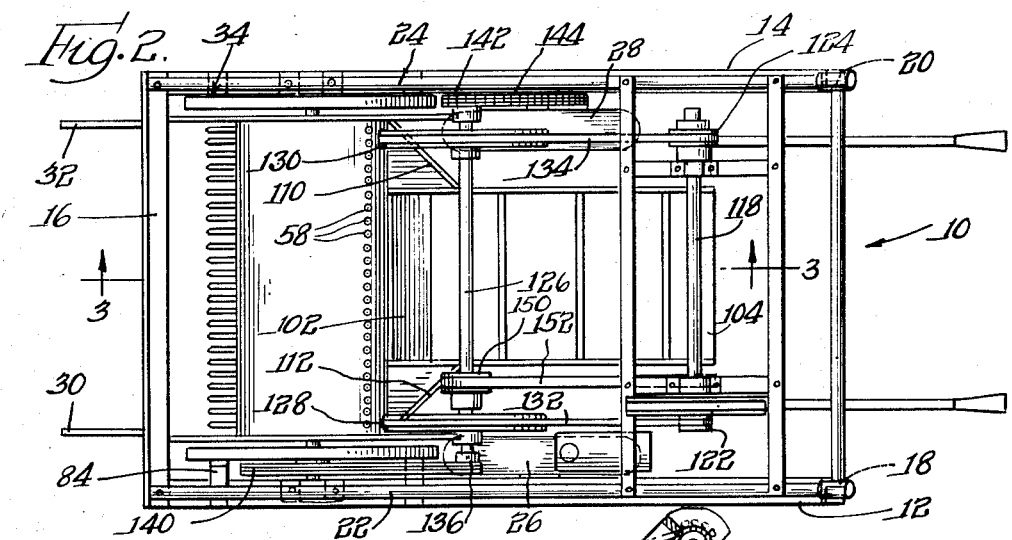
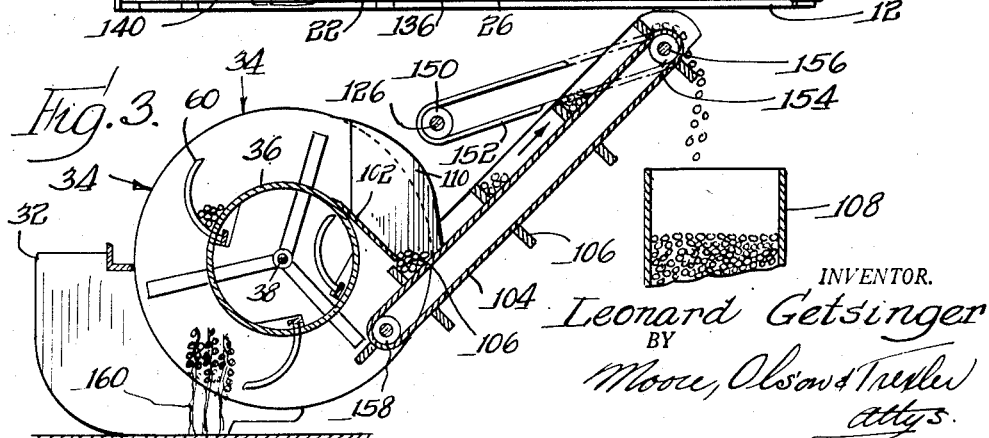
INVENTOR.
Leonard Getsinger Dec. 14, 1954  L. C. GETSINGER  2,696,706
CRANBERRY HARVESTING MACHINE
Filed Jan. 13, 1953  2 Sheets-Sheet 2
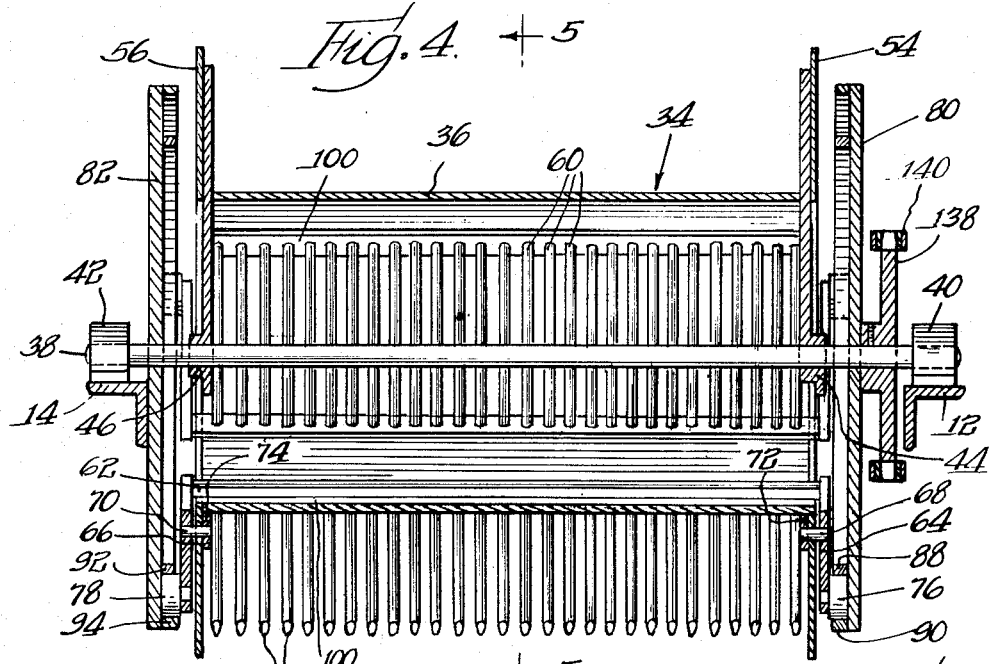
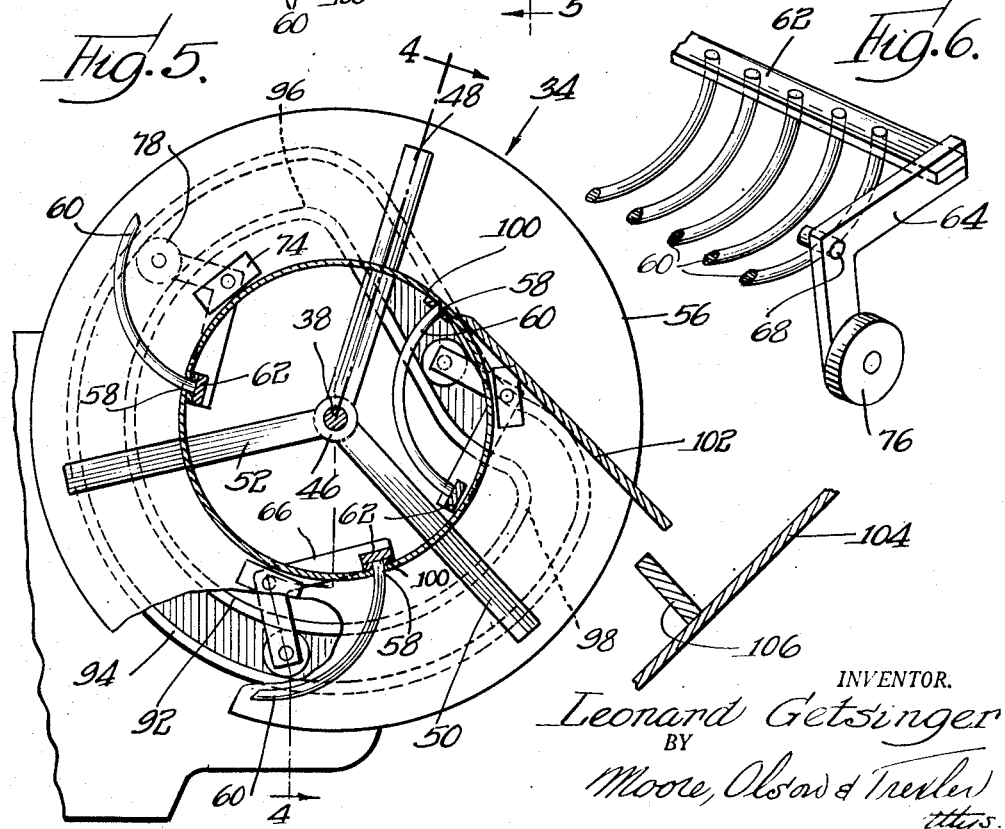
INVENTOR.
Leonard Getsinger
BY
Moore, Olson & Trexler
Attys.

United States Patent Office 2,696,706
Patented Dec. 14, 1954

2,696,706

CRANBERRY HARVESTING MACHINE

Leonard C. Getsinger, Wisconsin Rapids, Wis.

Application January 13, 1953, Serial No. 331,079

4 Claims. (Cl. 56—330)

The present invention relates to a novel harvesting machine, and more particularly to a novel harvesting machine especially adapted for harvesting cranberries and the like.

The harvesting of cranberries is a major problem facing the growers, which problem heretofore has never satisfactorily been solved. In the past, machines have been utilized to harvest cranberries, but in general these machines have never been entirely satisfactory since they do not efficiently harvest the berries, and they often injure the cranberry vines. Such prior art machines for harvesing berries generally include a member having straight teeth, which teeth are pushed straight through the vines to remove the berries. The vines often become tangled and jammed in the teeth, thereby injuring the vines and preventing efficient harvesting of the berries. It is, therefore, an important object of the invention to provide a novel cranberry harvesting machine which will efficiently harvest the berries while reducing the possibility of injury to the vines.

A more specific object of the present invention is to provide a novel cranberry harvesting machine that includes a plurality of elements or fingers mounted so as to dip into the vines to remove the berries and then rise out of the vines to deposit the berries at a desired location.

Another object of the present invention is to provide a novel harvesting machine of the above described type, wherein the elements which dip into the vines are automatically cleaned of dirt or hay or the like between each harvesting or picking operation so as to provide for more efficient harvesting and prevent entanglement with and injury to the vines.

Another object of the present invention is to provide a novel harvesting machine of the above described type which is of simple construction, whereby the machine may be economically manufactured.

Other objects and advantages of the present invention will appear from the following description and the accompanying drawings, wherein:

Fig. 1 is a side elevational view of an appartus involving the principles of this invention;

Fig. 2 is a plan view of the apparatus shown in Fig. 1;

Fig. 3 is a fragmentary cross sectional view taken along line 3—3 in Fig. 2;

Fig. 4 is an enlarged fragmentary cross sectional view of the device taken along line 4—4 in Fig. 5;

Fig. 5 is a cross sectional view with parts broken away taken along line 5—5 in Fig. 4; and Fig. 6 is a fragmentary perspective view illustrating the novel harvesting elements of this invention.

Referring now more specifically to the drawings, wherein like parts are designated by the same numerals throughout the various figures, a harvesting machine 10 is shown best in Figs. 1 and 2 and includes a frame having spaced horizontal members 12 and 14, a transverse member 16 at the front end, and a pair of upstanding frame members 18 and 20 at the rear end. A pair of suitably formed members 22 and 24 extend from the upper ends of the upstanding members 18 and 20 to the forward end of the frame. The above mentioned frame members may be secured together in any suitable way, such as by welding or riveting. If desired, additional frame members may be provided to strengthen and rigidify the structure.

The frame is mounted for movement on a pair of wheels 26 and 28 disposed at its opposite sides by suitable means. A pair of runners 30 and 32 are welded or otherwise secured to the forward end of the frame to hold the frame in a substantially horizontal position.

As shown in Figs. 1, 2, and 3, a berry harvesting mechanism generally designated by the numeral 34 is mounted adjacent the forward end of the frame. Referring more specifically to Figs. 4 and 5, the berry harvesting mechanism includes a hollow cylindrical drum 36 formed of sheet metal or the like. An axle 38 extends centrally through the drum and is mounted at opposite ends to the horizontal frame members 12 and 14 by suitable bearings 40 and 42. At the opposite ends of the drum, hubs 44 and 46 are keyed or otherwise fixed on the axle or shaft 38. A plurality of spokes 48, 50, and 52 are welded or otherwise fixed to each of the hubs and extend radially therefrom. These spokes are also welded to the ends of the drum 36 so that the drum is supported for rotation about the substantially horizontal axle or shaft 38. Preferably, suitable notches, not shown, are provided in the ends of the drum for receiving the spokes, whereby the spokes will be flush with the ends of the drum. It should be noted that the spokes extend radially for a considerable distance beyond the periphery of the drum and that annular drum flanges 54 and 56 are welded or otherwise fixed to the opposite ends of the drum and to the extending portions of the spokes and are generally in alignment with a corresponding one of the runners 32, 34 with which the flanges cooperate to confine and guide vines and the like toward the drum upon forward movement of the apparatus.

The drum 36 is provided with a plurality of rows of apertures 58, as shown best in Figs. 2 and 5. Berry picking or harvesting fingers 60 are mounted to extend through each of the apertures so that a row of the fingers will dip into the vines to pick the berries upon rotation of the drum. Referring particularly to Figs. 4 and 6, it is seen that the fingers 60 of each row are mounted on a bar 62 which extends through the interior of the drum. The opposite ends of the bar 62 are supported by bell cranks 64 and 66, which cranks are in turn pivoted to the drum flanges 54 and 56 by means of pins 68 and 70, respectively. Since the drum flanges are preferably formed of relatively thin sheet metal for economy purposes, short reinforcing strips 72 and 74 are preferably welded to the flanges, as shown in Figs. 4 and 5, for receiving the ends of the pivot pins and reinforcing the flanges. At the opposite ends of the bell cranks from the ends secured to the cross bar 62, there are mounted rollers or cam followers 76 and 78. These cam followers are adapted to engage suitable cams, whereby the bell cranks are pivoted about the pins 68 and 70 to cause the berry picking or harvesting finger 60 to be extended and retracted relative to the drum, as described more fully hereinbelow.

The above mentioned cam means includes cam or end plates 80 and 82 disposed at opposite ends of the drum and mounted on the horizontally extending frame members 12 and 14, respectively. The cam plate 80 is mounted on the frame member 12 by means of a pair of brackets 84 and 86 shown in Figs. 1 and 2. The cam plate 82 may be welded or otherwise mounted directly to the frame member 14. Inner and outer cam strips 88 and 90 are welded to the inwardly facing surface of the cam plate 80, and the cam roller 76 is disposed for movement between the cam strips, as illustrated in Fig. 5. These cam strips preferably have a rectangular cross section with the narrow edge welded to the cam plate. These strips are, of course, formed to provide cam surfaces with the desired shape. By this structure, the cams may be economically manufactured without requiring expensive machining operations. Substantially identical inner and outer cam strips 92 and 94 are welded to the inwardly facing surface of the cam plate 82 for actuating the cam roller or follower 78. As shown best in Fig. 5, the cam strips 92 and 94 are formed so as to provide a substantially constant diameter cam surface between the points 96 and 98. The cam strips 88 and 90 are, of course, formed to provide a similarly shaped cam surface. As illustrated best in Fig. 5, the bell cranks are held in a position so that the berry harvesting fingers 60 are fully extended radially of the drum while the cam followers travel along the constant diameter portion of the cams. As the cam follower passes the point 96 with the drum rotating in a clockwise direction, as viewed in Fig. 5, it will be seen that the bell crank is actuated to retract the berry harvesting fingers within the surface of the drum. During this retraction, any dirt or hay or the like is cleaned from the fingers by the surface of the drum. Since considerable wear may occur at the openings 58 of the drum as the fingers are extended and retracted, the relatively thin sheet metal drum may be reinforced around the openings by a bushing 100. After the fingers have been cleaned, the cam follower rides up on a high portion of the cam to the constant diameter portion at point 98 at which time the fingers will again be extended and in position to harvest the berries.

Referring now specifically to Figs. 2, 3, and 5, it is seen that an inclined panel 102 is mounted by any suitable means, not shown, so that the upper edge of the panel rides on the drum surface along a line just below the point at which the harvesting fingers are fully retracted. Thus, as the drum rotates, the berries picked up by each row of harvesting fingers are deposited on the upper surface of the drum and thence roll down the inclined panel 102. The inclined panel directs the berries onto a continuously operating conveyor 104, which is shown in Fig. 3. The conveyor carries a plurality of outstanding plates 106 which catch the berries as they drop from the inclined panel 102 and convey the berries to a point of discharge. It should be noted that the plates 106 are spaced along the conveyor a predetermined distance so that when one plate just passes the inclined panel 102, another plate is disposed on the upper run of the conveyor below the panel to catch the berries. As shown best in Fig. 3, the conveyor 104 is inclined upwardly from a point below the end of the panel 102 in order to convey the berries to a point above a receptacle or box 108 into which the berries are discharged. As shown best in Fig. 2, the conveyor 104 has a width less than the width of the drum 36, and, therefore, inclined baffles 110 and 112 are suitably disposed for guiding berries from the outer ends of the rotating drum to the conveyor.

In order to drive the novel harvesting machine of this invention, a suitable small gasoline engine 114 is mounted on the frame in any suitable manner and drives a large pulley 116 mounted on an axle 118 by means of a suitable belt 120. As shown in Fig. 2, the axle or drive shaft 118 extends transversely across the frame and has relatively small pulleys 122 and 124 secured to the opposite ends of the shaft. A second axle or shaft 126 is rotatably mounted in suitable bearings transversely of the apparatus and forwardly of the shaft 118. A pair of large diameter pulleys 128 and 130 are mounted adjacent the opposite ends of the shaft 126. A pair of flexible belts 132 and 134 are provided for driving the large pulleys 128 and 130 on the shaft 126 from the relatively small pulleys 122 and 124 on the shaft 118. By this structure, equal torque is applied to the opposite ends of the shaft 126 so that a smaller shaft may be used without danger of twisting. On one end of the shaft 126, there is mounted a relatively small sprocket wheel 136 for driving a relatively large sprocket wheel 138 secured to the drum axle or shaft 38 by means of a suitable drive chain 140. The opposite end of the drive shaft 126 is also provided with a sprocket wheel 142 for driving the wheels 26 and 28 through a drive chain 144 and a relatively large sprocket 146 mounted on the wheel axle 148.

In order to drive the conveyor 104, a pulley 150 is mounted on the shaft 126 for driving an endless belt 152, which belt in turn drives a pulley 154 mounted on the upper conveyor roller shaft 156, as shown best in Figs. 2 and 3. The lower end of the conveyor 104 passes over an idler pulley 158 which may be mounted in any suitable manner, not shown.

The operation of the above described device is as follows. The engine 114 is, of course, first started to drive the various elements of the apparatus. If desired, a suitable clutch mechanism, not shown, may be provided for engaging and disengaging the drive shaft 126 with the wheel drive mechanism. In any event, the wheel drive mechanism is proportioned so that the apparatus is driven at a rate of about one mile per hour, and the drive for the rotatable drum 36 is proportioned so that the drum is driven at the rate of about 15 R. P. M. It is noted that three sets of harvesting or picking fingers have been provided, and, therefore, there will be forty-five picking strokes per minute. In some cases, it may be desirable to provide a different number of sets of picking fingers.

As the apparatus advances through the field and the drum rotates, one set of picking fingers dips into the cranberry vines 160, as shown in Fig. 3, and strips the berries therefrom. It should be especially noted that the picking fingers 60 are curved toward the direction of rotation so that the fingers form pockets for holding the berries. It is, of course, understood that the fingers extend generally radially from the drum 36 in planes that are spaced from each other a distance less than the diameter of the berries so that the berries cannot pass between the fingers. It will be noted that the stroke of each set of fingers through the cranberry vines is relatively short before the fingers are withdrawn upwardly from the vines. Thus, any tendency for the vines to snag and clog the fingers is substantially reduced. As the drum continues to rotate, the berries harvested and caught in the pocket by the fingers are carried upwardly over the drum and deposited onto the inclined panel 102. From the panel 102, the berries are picked up by the conveyor 104 and deposited in the box 108 carried on the machine frame in the manner described above. As the fingers reach a position at the top of the drum, they are retracted within the drum by the cam mechanism heretofore described so that the fingers do not interfere with the inclined panel 102 and in addition are cleaned of any dirt or hay that may be clinging thereto.

From the above description, it is seen that the present invention provides a novel apparatus fully capable of performing the objects heretofore set forth. More specifically, it is seen that by the means for rotating a plurality of rows of fingers about a horizontal axis, each row of fingers travels only a relatively short distance through the berry vines on each harvesting stroke, whereby clogging of the fingers and injury to the vines is reduced and harvesting of the berries is efficiently effected. Furthermore, it is seen that the novel means for automatically retracting and cleaning the fingers after each harvesting stroke permits the fingers to harvest the berries continuously and efficiently. In addition, it will be seen that the relatively simple structure of the present invention permits the device to be economically manufactured.

While the preferred embodiment of the present invention has been shown and described herein, it is obvious that many changes may be made in the details of the disclosed structure without departing from the spirit and scope of the appended claims.

I claim:

1. An apparatus for harvesting cranberries and the like, comprising frame means, a pair of transversely spaced substantially parallel runners secured to and supporting a forward end of said frame means, wheel means located rearwardly of said runners and further supporting said frame means, a hollow drum mounted on said frame means above and rearwardly of said runners for rotation about a substantially horizontal axis extending transversely of said frame means, said drum being disposed adjacent the forward end of said frame means and behind said runners, a radially extending flange secured to each end of said drum, each of said flanges being in general alignment with one of said runners and said runners having substantially vertically extending portions whereby said runners and said flanges cooperate to confine and guide cranberry vines and the like toward said drum upon forward movement of said frame means, a plurality of harvesting fingers spaced around said drum, said harvesting fingers being disposed in a plurality of rows extending longitudinally of the drum, means mounting said harvesting fingers for movement to and from retracted positions within the drum and extended positions projecting radially from said drum, and means mounted on said frame means for driving said drum and wheels in predetermined timed relationship.

2. An apparatus, as defined in claim 1, wherein said harvesting finger mounting means includes a plurality of elongated members disposed within and extending longitudinally of said drum, inner ends of the fingers in each of said rows being connected with one of said elongated members, lever means pivotally mounted on the drum and supporting said elongated members for oscillating movement within the drum, and cam means fixed on said frame means for actuating said lever means upon rotation of the drum.

3. An apparatus, as defined in claim 2, which includes said harvesting fingers being arcuate, said drum having apertures for closely slidably receiving each of said harvesting fingers, said apertures being substantially the same size as their associate fingers to insure substantially complete cleaning of the fingers upon retraction thereof, and said lever means supporting said elongated members for oscillating movement having a radius substantially equal to the radius of the arc of said fingers so as to avoid binding between the fingers and the drum.

4. An apparatus as defined in claim 2 wherein the drum flanges have mounted thereon the lever means supporting said elongated members.

References Cited in the file of this patent

UNITED STATES PATENTS

| Number | Name | Date |
|---|---|---|
| 69,045 | Terrell | Sept. 17, 1867 |
| 546,777 | Hasey | Sept. 24, 1895 |
| 889,968 | Rickey | June 9, 1908 |
| 983,662 | White | Feb. 7, 1911 |
| 1,035,485 | Sletto | Aug. 13, 1912 |
| 1,047,327 | Stewart | Dec. 17, 1912 |
| 1,114,416 | Tingley et al. | Oct. 20, 1914 |
| 1,170,616 | Dintamon | Feb. 8, 1916 |
| 1,371,306 | Hayden | Mar. 15, 1921 |
| 1,411,958 | Dain | Apr. 4, 1922 |
| 1,540,919 | Baldwin | June 9, 1925 |
| 1,707,878 | Roosa | Apr. 2, 1929 |
| 1,908,082 | Tinsley | May 9, 1933 |
| 2,230,523 | Byhre | Feb. 4, 1941 |
| 2,233,837 | Fuhrhop | Mar. 4, 1941 |
| 2,388,212 | McElhoe et al. | Oct. 30, 1945 |